W. R. DILLON.
NUT LOCK.
APPLICATION FILED JULY 7, 1915.
1,168,862.
Patented Jan. 18, 1916.
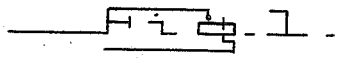
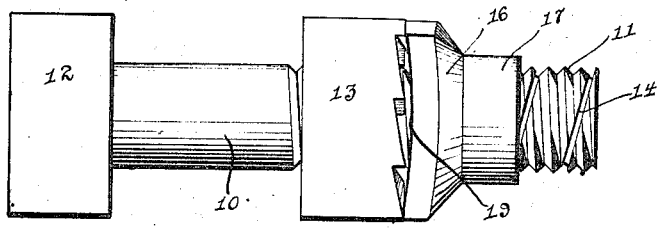
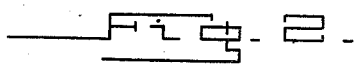 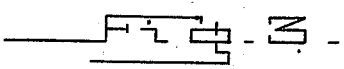
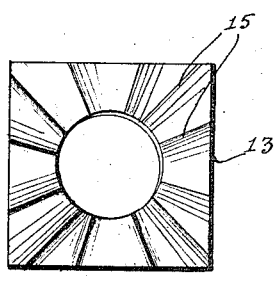 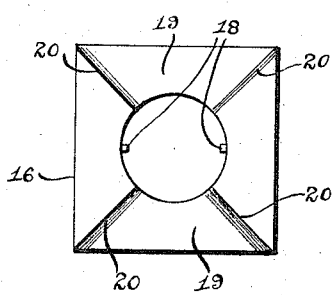
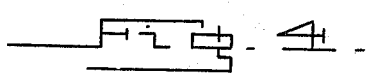 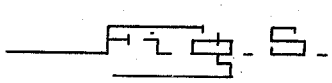
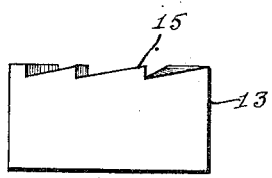 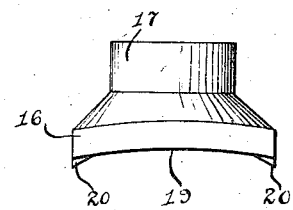
Witnesses
Francis Ph. O'Reilly
J. Reany P. Kelly
Inventor
William R. Dillon.
By Richard B. Owen,
Attorney

UNITED STATES PATENT OFFICE.

WILLIAM R. DILLON, OF CHEROKEE, OKLAHOMA.

NUT-LOCK.

1,168,862. Specification of Letters Patent. Patented Jan. 18, 1916.

Application filed July 7, 1915. Serial No. 38,548.

*To all whom it may concern:*

Be it known that I, WILLIAM R. DILLON, a citizen of the United States, residing at Cherokee, in the county of Alfalfa and State of Oklahoma, have invented certain new and useful Improvements in Nut-Locks, of which the following is a specification.

The present invention relates to a new and improved nut lock and the main object is to provide a highly practical device of this nature which is both simple in construction and efficient in operation, and which, it is believed may be manufactured at a minimum cost.

The invention further contemplates the provision of an improved nut lock of that type wherein the bolt is provided with oppositely extending screw threads, the locking action being attained through the co-action of a pair of nut members and which affords greater facilities for obtaining a more positive locking action than in the prior devices of this nature.

A further object is to provide a nut lock of the type set forth above wherein one of the co-acting nut members is provided with a concave bearing face so that when the same are forced into engagement with one another, a desirable resilient action will be exerted which will tend to lock the said nuts in a secure and rigid position.

Various other objects and advantages will become apparent during the continuance of the following description.

The above and other objects which will become apparent, are accomplished by such means as are shown in their preferred form in the accompanying drawings, described in the following specification and then more specifically pointed out in the appended claims.

In the accompanying drawings wherein like characters designate like parts throughout the several views; Figure 1 is a side elevation of my invention. Fig. 2 is a detail view of the engaging face of one of the nut members. Fig. 3 is a similar view of the other of the nut members. Fig. 4 is a side elevation of the nut member illustrated in Fig. 2. Fig. 5 is a side elevation of the nut member shown in Fig. 3.

In the drawings the numeral 10 designates the bolt shank, which is screw threaded a portion of its length as at 11 and carries a head member 12 at one end which is of the usual and well known construction. Upon reference to Fig. 1 it will be noted that the screw threads 11 are "right-hand" so as to accommodate the main nut member 13 and allow the same to be effectually operated thereon. However, the said shank is provided with a spirally extending groove 14 which extends in an opposite direction to the screw threads 11 and is designed for the purpose that will presently appear.

Upon reference to Fig. 2, it will be noted that the outer, or engaging face, of the nut 13 is provided with a series of ratchet teeth 15, which radiate from the interior bore thereof in the manner clearly shown. Now, in order to coöperate with the main nut 13 and to provide means for effectually locking the same in position, an auxiliary nut member 16 is employed the bore of which is slightly larger than the bolt 10 and carries an annular collar 17 which fits loosely about the screw threaded shank thereof. The said collar in turn carries a pair of inwardly projecting lugs 18 which enter the spiral groove 14 and thus by proper manipulation of the auxiliary nut the same may be effectually moved upon the bolt. However it will be noted that the direction of turning of the auxiliary nut 16 will be opposite to the direction of turning of the main nut 13.

The inner, or engaging face of the auxiliary nut 16 is concave as shown at 19, the same being provided at suitable points with cam faced projections 20 for engagement with the ratchet teeth 15 on the main nut 13. Hence it will be understood that when the auxiliary nut 16 is forcibly secured into engagement with the main nut 13, the cam faced projections on the auxiliary nut will be positively forced in engagement with the ratchet teeth 15 and thus securely lock the main nut in position. By reason of the concaved construction of the auxiliary nut it will be appreciated that the same will embody an unusual degree of elasticity which will permit the same to be moved upon the bolt a certain distance after the cam faced projections 20 engage the ratchet teeth 15 whereby a more efficient and effectual locking action will be obtained. It will be noted that when the said nut members have been locked together, that the removal of the same without the complete distortion of the same will be practically impossible. The greatest of stress is directed to the simplicity of the entire device and the specific construction of the auxiliary nut 16. However from the foregoing it is believed that the advantages and novel features of my invention will be readily understood and therefore further detailed description is deemed unnecessary.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim as new and desire to secure by Letters Patent is:

1. In a nut lock, the combination with a bolt screw threaded a portion of its length and provided with a spiral groove extending in an opposite direction to said screw threads, a main nut member operative on said bolt and engaging said screw threads, the upper face of said nut provided with a series of ratchet teeth, an auxiliary nut loosely mounted on said bolt with respect to said screw threads, a collar carried by said auxiliary nut and provided with inwardly projecting lugs for engagement with said spiral groove, the inner face of said auxiliary nut being concave to exert a clamping action and provided with a series of cam faced projections for engagement with said ratchet teeth to positively lock said main nut in place, as and for the purpose specified.

2. A nut lock including in combination, a bolt screw threaded a portion of its length and having a spiral groove extending oppositely to said screw threads, a main nut member operative on the screw threaded portion of said bolt, one end of said main nut member being provided with a plurality of ratchet teeth, an auxiliary nut member having a bore of slightly greater diameter than the diameter of said bolt, a collar formed on said auxiliary nut and forming a portion that may be gripped by a wrench, one face of said auxiliary nut being concaved, the concave face of said auxiliary nut having a plurality of cam faced projections for engagement with the ratchet teeth on said main nut member whereby when said nuts are brought together a clamping action will be exerted by the concaved face of said auxiliary nut to more securely retain the nuts against independent movement.

In testimony whereof I affix my signature in presence of two witnesses.

WILLIAM R. DILLON.

Witnesses:
GEO. REDMAN,
HENRY SUMMERS.